United States Patent
Dorwin

(10) Patent No.: US 9,311,459 B2
(45) Date of Patent: *Apr. 12, 2016

(54) APPLICATION-DRIVEN PLAYBACK OF OFFLINE ENCRYPTED CONTENT WITH UNAWARE DRM MODULE

(71) Applicant: Google Inc., Mountain View, CA (US)

(72) Inventor: David Kimbal Dorwin, Kirkland, WA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/800,680

(22) Filed: Jul. 15, 2015

(65) Prior Publication Data

US 2015/0317462 A1  Nov. 5, 2015

Related U.S. Application Data

(63) Continuation of application No. 13/586,664, filed on Aug. 15, 2012, now Pat. No. 9,110,902.

(60) Provisional application No. 61/569,755, filed on Dec. 12, 2011.

(51) Int. Cl.
*G06F 12/14* (2006.01)
*G06F 21/10* (2013.01)
(Continued)

(52) U.S. Cl.
CPC ............ *G06F 21/10* (2013.01); *G06F 11/3003* (2013.01); *G06F 21/602* (2013.01);
(Continued)

(58) Field of Classification Search
CPC ..................... H04L 2209/603; H04N 21/2541; G06F 21/10
See application file for complete search history.

(56) References Cited

U.S. PATENT DOCUMENTS

| | | |
|---|---|---|
| 4,535,355 A | 8/1985 | Arn et al. |
| 4,694,489 A | 9/1987 | Frederiksen |

(Continued)

FOREIGN PATENT DOCUMENTS

| | | |
|---|---|---|
| EP | 658054 | 6/1995 |
| EP | 714204 | 5/1996 |

(Continued)

OTHER PUBLICATIONS

"Digital rights management," Wikipedia, the free encyclopedia, last modified Mar. 30, 2012, 30 pages http://en.wikipedia.org/w/index.php?title=Digital.sub.--rights.sub.--mana-gement&printable=yes.

(Continued)

*Primary Examiner* — Shewaye Gelagay
*Assistant Examiner* — Khoi Le
(74) *Attorney, Agent, or Firm* — Fenwick & West LLP

(57) ABSTRACT

Application-driven interceptor module enables offline playback of Digital Rights Management (DRM) protected content to work in a same way as online playback. Communications with the DRM module are intercepted by the application-driven interceptor that is aware of the client device's network connection status. When the interceptor application determines that the client device is offline, requests for the protected content, and license/key to the protected content may then be managed by the interceptor application. In one embodiment, the interceptor application may retrieve requests for the key/license from a locally protected data store, and provide the key/license to the DRM module. In this manner, the DRM module may be unaware that its messages are being intercepted, and may then operate the same, unaware of whether or not the client device is online or offline.

20 Claims, 5 Drawing Sheets

(51) Int. Cl.

| | | |
|---|---|---|
| *G06F 21/62* | (2013.01) | |
| *H04L 29/06* | (2006.01) | |
| *G06F 21/60* | (2013.01) | |
| *H04L 9/06* | (2006.01) | |
| *G06F 11/30* | (2006.01) | |
| *H04N 21/258* | (2011.01) | |
| *H04N 21/45* | (2011.01) | |

(52) U.S. Cl.
CPC ........... *G06F 21/62* (2013.01); *G06F 21/6209* (2013.01); *H04L 9/0631* (2013.01); *H04L 63/0428* (2013.01); *H04L 63/06* (2013.01); *H04L 63/102* (2013.01); *G06F 2221/0724* (2013.01); *G06F 2221/0759* (2013.01); *H04L 2209/603* (2013.01); *H04L 2463/101* (2013.01); *H04N 21/25825* (2013.01); *H04N 21/25833* (2013.01); *H04N 21/4516* (2013.01)

(56) References Cited

U.S. PATENT DOCUMENTS

| | | |
|---|---|---|
| 5,067,035 A | 11/1991 | Kudelski et al. |
| 5,134,656 A | 7/1992 | Kudelski |
| 5,144,663 A | 9/1992 | Kudelski et al. |
| 5,191,611 A | 3/1993 | Lang |
| 5,339,413 A | 8/1994 | Koval et al. |
| 5,375,168 A | 12/1994 | Kudelski |
| 5,392,351 A | 2/1995 | Hasebe et al. |
| 5,487,167 A | 1/1996 | Dinallo et al. |
| 5,539,450 A | 7/1996 | Handelman |
| 5,590,200 A | 12/1996 | Nachman et al. |
| 5,592,212 A | 1/1997 | Handelman |
| 5,621,799 A | 4/1997 | Katta et al. |
| 5,640,546 A | 6/1997 | Gopinath et al. |
| 5,666,412 A | 9/1997 | Handelman et al. |
| 5,684,876 A | 11/1997 | Pinder et al. |
| 5,758,257 A | 5/1998 | Herz et al. |
| 5,774,527 A | 6/1998 | Handelman et al. |
| 5,774,546 A | 6/1998 | Handelman et al. |
| 5,799,089 A | 8/1998 | Kuhn et al. |
| 5,805,705 A | 9/1998 | Gray et al. |
| 5,870,474 A | 2/1999 | Wasilewski et al. |
| 5,878,134 A | 3/1999 | Handelman et al. |
| 5,883,957 A | 3/1999 | Moline et al. |
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter et al. |
| 5,920,625 A | 7/1999 | Davies |
| 5,920,861 A | 7/1999 | Hall et al. |
| 5,922,208 A | 7/1999 | Demmers |
| 5,923,666 A | 7/1999 | Gledhill et al. |
| 5,933,498 A | 8/1999 | Schneck et al. |
| 5,939,975 A | 8/1999 | Tsuria et al. |
| 5,943,422 A | 8/1999 | Van Wie et al. |
| 5,949,876 A | 9/1999 | Ginter et al. |
| 5,974,549 A | 10/1999 | Golan |
| 5,982,891 A | 11/1999 | Ginter et al. |
| 5,991,399 A | 11/1999 | Graunke et al. |
| 6,009,116 A | 12/1999 | Bednarek et al. |
| 6,009,401 A | 12/1999 | Horstmann |
| 6,009,525 A | 12/1999 | Horstmann |
| 6,021,197 A | 2/2000 | von Willich et al. |
| 6,035,037 A | 3/2000 | Chaney |
| 6,038,433 A | 3/2000 | Vegt |
| 6,049,671 A | 4/2000 | Slivka et al. |
| 6,055,503 A | 4/2000 | Horstmann |
| 6,073,256 A | 6/2000 | Sesma |
| 6,112,181 A | 8/2000 | Shear et al. |
| 6,138,119 A | 10/2000 | Hall et al. |
| 6,141,753 A | 10/2000 | Zhao et al. |
| 6,157,721 A | 12/2000 | Shear et al. |
| 6,160,891 A | 12/2000 | Al-Salqan |
| 6,178,242 B1 | 1/2001 | Tsuria |
| 6,185,683 B1 | 2/2001 | Ginter et al. |
| 6,189,097 B1 | 2/2001 | Tycksen, Jr. et al. |
| 6,191,782 B1 | 2/2001 | Mori et al. |
| 6,226,618 B1 | 5/2001 | Downs et al. |
| 6,226,794 B1 | 5/2001 | Anderson, Jr. et al. |
| 6,237,786 B1 | 5/2001 | Ginter et al. |
| 6,240,185 B1 | 5/2001 | Van Wie et al. |
| 6,247,950 B1 | 6/2001 | Hallam et al. |
| 6,253,193 B1 | 6/2001 | Ginter et al. |
| 6,256,668 B1 | 7/2001 | Slivka et al. |
| 6,272,636 B1 | 8/2001 | Neville et al. |
| 6,285,985 B1 | 9/2001 | Horstmann |
| 6,292,569 B1 | 9/2001 | Shear et al. |
| 6,298,441 B1 | 10/2001 | Handelman et al. |
| 6,311,221 B1 | 10/2001 | Raz et al. |
| 6,314,409 B2 | 11/2001 | Schneck et al. |
| 6,314,572 B1 | 11/2001 | LaRocca et al. |
| 6,334,213 B1 | 12/2001 | Li |
| 6,363,488 B1 | 3/2002 | Ginter et al. |
| 6,385,596 B1 | 5/2002 | Wiser et al. |
| 6,389,402 B1 | 5/2002 | Ginter et al. |
| 6,405,369 B1 | 6/2002 | Tsuria |
| 6,409,080 B2 | 6/2002 | Kawagishi |
| 6,409,089 B1 | 6/2002 | Eskicioglu |
| 6,415,031 B1 | 7/2002 | Colligan et al. |
| 6,427,140 B1 | 7/2002 | Ginter et al. |
| 6,449,367 B2 | 9/2002 | Van Wie et al. |
| 6,449,719 B1 | 9/2002 | Baker |
| 6,459,427 B1 | 10/2002 | Mao et al. |
| 6,460,023 B1 | 10/2002 | Bean et al. |
| 6,466,670 B1 | 10/2002 | Tsuria et al. |
| 6,505,299 B1 | 1/2003 | Zeng et al. |
| 6,587,561 B1 | 7/2003 | Sered et al. |
| 6,618,484 B1 | 9/2003 | Van Wie et al. |
| 6,629,243 B1 | 9/2003 | Kleinman et al. |
| 6,633,918 B2 | 10/2003 | Agarwal et al. |
| 6,634,028 B2 | 10/2003 | Handelman |
| 6,640,304 B2 | 10/2003 | Ginter et al. |
| 6,651,170 B1 | 11/2003 | Rix |
| 6,654,420 B1 | 11/2003 | Snook |
| 6,654,423 B2 | 11/2003 | Jeong et al. |
| 6,658,568 B1 | 12/2003 | Ginter et al. |
| 6,668,325 B1 | 12/2003 | Collberg et al. |
| 6,792,113 B1 | 9/2004 | Ansell et al. |
| 7,007,170 B2 | 2/2006 | Morten |
| 7,165,175 B1 | 1/2007 | Kollmyer et al. |
| 7,356,143 B2 | 4/2008 | Morten |
| 7,578,002 B2 | 8/2009 | Risan et al. |
| 7,640,435 B2 | 12/2009 | Morten |
| 7,805,616 B1 | 9/2010 | Mohammed et al. |
| 7,817,608 B2 | 10/2010 | Rassool et al. |
| 7,827,613 B2 | 11/2010 | Koved et al. |
| 7,953,882 B2 | 5/2011 | Shukla et al. |
| 8,457,311 B1 | 6/2013 | Schultz et al. |
| 8,560,642 B2 | 10/2013 | Pantos et al. |
| 2002/0001385 A1 | 1/2002 | Kawada et al. |
| 2002/0015498 A1 | 2/2002 | Houlberg et al. |
| 2002/0021761 A1 | 2/2002 | Zhang et al. |
| 2002/0021805 A1 | 2/2002 | Schumann et al. |
| 2002/0049679 A1 | 4/2002 | Russell et al. |
| 2002/0089410 A1 | 7/2002 | Janiak et al. |
| 2002/0104004 A1 | 8/2002 | Couillard |
| 2002/0107803 A1 | 8/2002 | Lisanke et al. |
| 2002/0141582 A1 | 10/2002 | Kocher et al. |
| 2003/0007568 A1 | 1/2003 | Hamery et al. |
| 2003/0037261 A1 | 2/2003 | Meffert et al. |
| 2003/0046568 A1 | 3/2003 | Riddick et al. |
| 2003/0154265 A1 | 8/2003 | Raffaele et al. |
| 2004/0031856 A1 | 2/2004 | Atsmon et al. |
| 2004/0117500 A1 | 6/2004 | Lindholm et al. |
| 2004/0151315 A1 | 8/2004 | Kim |
| 2004/0184616 A1 | 9/2004 | Morten |
| 2004/0230806 A1 | 11/2004 | Lisanke |
| 2005/0027871 A1 | 2/2005 | Bradley et al. |
| 2005/0066353 A1 | 3/2005 | Fransdonk |
| 2005/0125358 A1 | 6/2005 | Levin et al. |
| 2005/0193205 A1 | 9/2005 | Jacobs et al. |
| 2005/0273862 A1 | 12/2005 | Benaloh et al. |
| 2006/0020811 A1 | 1/2006 | Tan |

(56) References Cited

U.S. PATENT DOCUMENTS

| | | | |
|---|---|---|---|
| 2006/0212363 | A1 | 9/2006 | Peinado et al. |
| 2006/0225107 | A1 | 10/2006 | Seetharaman et al. |
| 2006/0280150 | A1 | 12/2006 | Jha et al. |
| 2007/0005795 | A1 | 1/2007 | Gonzalez |
| 2007/0067321 | A1 | 3/2007 | Bissett et al. |
| 2007/0089174 | A1 | 4/2007 | Bader et al. |
| 2007/0160208 | A1 | 7/2007 | MacLean et al. |
| 2007/0204300 | A1 | 8/2007 | Markley et al. |
| 2007/0209005 | A1 | 9/2007 | Shaver et al. |
| 2007/0219917 | A1 | 9/2007 | Liu et al. |
| 2007/0234291 | A1 | 10/2007 | Ronen et al. |
| 2007/0294170 | A1 | 12/2007 | Vantalon et al. |
| 2008/0027871 | A1 | 1/2008 | Seo |
| 2008/0052641 | A1 | 2/2008 | Brown et al. |
| 2008/0137848 | A1 | 6/2008 | Kocher et al. |
| 2008/0147671 | A1 | 6/2008 | Simon et al. |
| 2008/0155586 | A1 | 6/2008 | Yang et al. |
| 2008/0155673 | A1 | 6/2008 | Jung et al. |
| 2008/0267399 | A1 | 10/2008 | Medvinsky et al. |
| 2008/0288611 | A1 | 11/2008 | Toyomura et al. |
| 2008/0307454 | A1 | 12/2008 | Ahanger et al. |
| 2008/0313264 | A1* | 12/2008 | Pestoni .................. G06F 21/10 709/202 |
| 2009/0006862 | A1 | 1/2009 | Alkove et al. |
| 2009/0007198 | A1 | 1/2009 | Lavender et al. |
| 2009/0031408 | A1 | 1/2009 | Thom et al. |
| 2009/0044008 | A1 | 2/2009 | Lim |
| 2009/0183001 | A1* | 7/2009 | Lu .......................... G06F 21/10 713/168 |
| 2009/0197238 | A1 | 8/2009 | Moffatt et al. |
| 2009/0208016 | A1 | 8/2009 | Choi et al. |
| 2009/0249426 | A1 | 10/2009 | Aoki et al. |
| 2010/0023760 | A1 | 1/2010 | Lee et al. |
| 2010/0027974 | A1 | 2/2010 | Ansari |
| 2010/0145794 | A1 | 6/2010 | Barger et al. |
| 2010/0180289 | A1 | 7/2010 | Barsook et al. |
| 2010/0199104 | A1 | 8/2010 | Van Rijnswou |
| 2010/0211776 | A1 | 8/2010 | Gunaseelan et al. |
| 2010/0235820 | A1 | 9/2010 | Khouzam et al. |
| 2010/0242097 | A1 | 9/2010 | Hotes et al. |
| 2010/0250532 | A1 | 9/2010 | Soroushian et al. |
| 2010/0299701 | A1 | 11/2010 | Liu et al. |
| 2011/0069936 | A1 | 3/2011 | Johnson et al. |
| 2011/0179283 | A1 | 7/2011 | Thom et al. |
| 2011/0225417 | A1 | 9/2011 | Maharajh et al. |
| 2011/0305273 | A1 | 12/2011 | He et al. |
| 2011/0314284 | A1 | 12/2011 | Chou |
| 2012/0066494 | A1 | 3/2012 | Lee et al. |
| 2012/0079578 | A1 | 3/2012 | Dachiraju et al. |
| 2012/0114118 | A1 | 5/2012 | Verma |
| 2012/0117183 | A1 | 5/2012 | Wong et al. |
| 2012/0173884 | A1 | 7/2012 | Patil |
| 2012/0317414 | A1 | 12/2012 | Glover |
| 2012/0331293 | A1 | 12/2012 | Ma et al. |
| 2013/0072126 | A1 | 3/2013 | Topaltzas et al. |
| 2013/0097302 | A9 | 4/2013 | Khedouri et al. |
| 2013/0145406 | A1 | 6/2013 | Baskaran et al. |
| 2013/0174222 | A1 | 7/2013 | Ogle |

FOREIGN PATENT DOCUMENTS

| | | |
|---|---|---|
| EP | 852445 | 7/1998 |
| EP | 886409 | 12/1998 |
| EP | 1134977 | 9/2001 |
| EP | 1246463 | 10/2002 |
| JP | 3203432 | 9/1991 |
| JP | 8335040 | 12/1996 |
| JP | 10336128 | 12/1998 |
| JP | 11175475 | 7/1999 |
| JP | 2000022680 | 1/2000 |
| JP | 2000196585 | 7/2000 |
| JP | 2000293945 | 10/2000 |
| JP | 2001251599 | 9/2001 |
| WO | WO 96/06504 | 2/1996 |
| WO | WO 96/32702 | 10/1996 |
| WO | WO 99/21364 | 4/1999 |
| WO | WO 99/28842 | 6/1999 |
| WO | WO 99/30499 | 6/1999 |
| WO | WO 99/54453 | 10/1999 |
| WO | WO 01/35571 | 5/2001 |
| WO | WO 01/93212 | 12/2001 |
| WO | WO 02/21761 | 3/2002 |
| WO | WO 2004/02112 | 12/2003 |

OTHER PUBLICATIONS

"Establishing Interconnectivity among Various Makers' Products through Standardization of VOD Protocol", NTT Corporation Press Release, Sep. 27, 2002 http://www.ntt.co.jp/news/news02e/0209/020927.html.

"High-bandwidth Digital Content Protection," Wikipedia, the free encyclopedia, last modified Nov. 14, 2012, 7 pages http://en.wikipedia.org/w/index.php?title=High-bandwidth.sub.--Digital.sub.--Content.sub.--Protection&printable=yes.

"Intelligent Systems for Finance and Business," Goonatilake, S. et al., eds., Chapters 2-10, 1995, pp. 31-173.

"Irdeto Access and Optibase create Strategic Alliance", Press Release, Irdeto Access, Dec. 14, 2000 pp. 1-4 http://www.irdetoaccess.com/press/0000041.htm.

"Irdeto Access and Optibase create Strategic Alliance", Press Release, Optibase, Dec. 14, 2000, pp. 1-2 http://www.optibase.com/html/news/December.sub.--14.sub.--2000.html.

"PlayReady," Wikipedia, the free encyclopedia, last modified Jan. 30, 2012, 2 pages http://en.wikipedia.org/w/index.php?title=PlayReady&printable=yes.

"Scalable Video Coding," Wikipedia, the free encyclopedia, last modified Sep. 10, 2012, 4 pages. http://en.wikipedia.org/w/index.php?title=Scalable.sub.--Video.sub.--Codi-ng&printable=yes.

"UltraViolet (system)," Wikipedia, the free encyclopedia, last modified Feb. 20, 2012, 5 pages http://en.wikipedia.org/w/index.php?title=:UltraViolet.sub.--(systern)&pr-intable=yes.

"What is HDCP (high definition copy protocol)?" Digital Connection, 2005, 2 pages http://www.digitalconnection.com/FAQ/HDTV.sub.--12.asp.

Balthrop, J. et al., "Coverage and Generalization in an Artificial Immune System", Proceedings of Genetic and Evolutionary Computation Conference (GECCO), 2002, pp. 1-8.

Blumenfeld, S. M., "Streaming Media--System Security," Broadcast Engineering Magazine, Oct. 2001, pp. 1-2.

Canadian Examiner Report for Application No. 2,559,323 mailed May 6, 2008, 3 pages.

Cheng, H. C. H., "Partial Encryption for Image and Video Communication", Department of Computing Science, University of Alberta, Fall 1998, pp. 1-87.

Cheng, H. et al., "Partial Encryption of Compressed Images and Videos", IEEE Transactions on Signal Processing, vol. 48, No. 8, Aug. 2000, pp. 2439-2451.

Deitcher, D., "Secure Implementations of Content Protection (DRM) Schemes on Consumer Electronic Devices," Discretix, White Paper, May 2011, 17 pages.

Eskicioglu, A. M. et al., "An Overview of Multimedia Content Protection in Consumer Electronics Devices", SP:IC, vol. 16 No. 7, Apr. 2001, pp. 681-699.

Ferrill, E. et al., "A Survey of Digital Watermarking", Feb. 25, 1999, 15 pages. http://elizabeth.ferrill.com/papers/watermarking.pdf.

Forrest, S., "Research Projects," Dec. 2, 2003, pp. 1-3 http://www.cs.unm.edu/.about.forrest/projects.html.

Goodman, J. et al., "Low Power Scalable Encryption for Wireless Systems", Wireless Networks, No. 4, 1998, pp. 55-70.

Griwodz, C. et al., "Protecting VoD the Easier Way", ACM Multimedia, Bristol, UK, Jan. 1998, pp. 21-28.

Griwodz, C., "Video Protection by Partial Content Corruption", Multimedia and Security Workshop at ACM Multimedia, Bristol, UK, Sep. 1998, pp. 1-5.

Hunter, J., et al., "A Review of Video Streaming Over the Internet", DSTC Technical Report TR97-10, Aug. 1997, pp. 1-28.

(56) References Cited

OTHER PUBLICATIONS

International Search Report and Written Opinion for International Patent Application No. PCT/US07/62055 mailed Sep. 11, 2007.
Kirovski, D. et al, "Digtal Rights Management for Digital Cinema" Proceedings of the SPIE, Bellingham, VA, vol. 4472, Jul. 31, 2001, p. 105-120.
Office Action for European Patent Application No. 05250968.4 mailed Jan. 26, 2006.
Official Communication for Chinese Patent Application No. 2004800071571 mailed Apr. 13, 2007.
Official Communication for European Patent Application No. 04757582.4 mailed May 22, 2007.
Omneon Video Networks Product Announcement, "Broadband Streaming—Omneon and BSkyB", TB-1006-1, created 2002, pp. 1-4.
Schulzrinne, H., et al., "Real Time Streaming Protocol (RTSP)," RRC 2326, Apr. 1998, pp. 1-86.
Schulzrinne, H., et al., "RTP: A Transport Protocol for Real-Time Applications", RFC 1889, Jan. 1996, pp. 1-75.
Search Report for European Patent Application No. 05250968.4 mailed Oct. 12, 2005.
Spanos, G. et al., "Performance Study of a Selective Encryption Scheme for the Security of Networked, Real-Time Video", Proceedings of the Fourth International Conference on Computer Communications and Networks, ICCCN '95, Las Vegas, NV, Sep. 1995, pp. 2-10.
Supplementary Eruopean Search Report for European Patent Application No. 00986215 dated Nov. 14, 2005.
Supplementary European Search Report for European Patent Application No. 04757582.4 mailed Nov. 20, 2006.
Teixeira, L. M. et al, "Secure Transmission of MPEG Video Sources", Proceedings of IEEE Workshop on ISPACS, Nov. 6, 1998, pp. 1-5.
Wu, T.-L. et al., "Selective Encryption and Watermarking of MPEG Video (Exended Abstract)", submitted to International Conference on Image Science, Systems, and Technology, Feb. 17, 1997, 10 pages.
Yoshida, K. et al., "A Continuous-Media Communication Method for Minimizing Playback Interruptions", IS&T/SPIE Conference on Visual Communications and Image Processing, San Jose, California, vol. 3653, Jan. 1999, 10 pages.
Zhang, J. et al., "A Flexible Content Protection System for Media-On-Demand", Proceedings of the Fourth International Symposium on Multimedia Software Engineering 2002, Dec. 11-13, 2002, Piscataway, NJ, Dec. 11, 2002, pp. 272-277.
"A new approach to browser security: the Google Chrome Sandbox," Chromium Blog, http://blog.chromium.org/2008/10/new-approach-to-browser-security-g-oogle.html, 5 pages, Oct. 2, 2008.
"Conditional access," Wikipedia, the free encyclopedia, http://en.wikipedia.org/wiki/Conditional.sub.--access, 8 pages, created Jul. 7, 2005.
"Encrypted Media Extensions, W3C Editor's Draft Dec. 17, 2012," W3C, http://dvcs.w3.org/hg/html-media/raw-file/tip/encrypted-media/encrypted-m-edia.html, 32 pages, created Feb. 22, 2012, current draft dated Dec. 17, 2012.
"Getting Started: Background and Basics—The Chromium Projects," http://chromium.org/nativeclient/getting-started/getting-started-backgrou-nd-and-basics, 4 pages, Sep. 2, 2008.
"Google Native Client," Wikipedia, the free encyclopedia, http://en.wikipedia.org/wiki/Google.sub.--Native.sub.--Client, 6 pages, created Dec. 9, 2008.
"HTML5," Wikipedia, the free encyclopedia, http://en.wikipedia.org/wiki/HTML5, 9 pages, created Nov. 16, 2006.
"Media Source Extensions, W3C Editor's Draft Dec. 18, 2012," http://dvcs.w3.org/hg/html-media/raw-file/tip/media-source/media-source.h-tml, 25 pages, created Jul. 11, 2011, current draft dated Dec. 18, 2012.
"Media Source Extensions," http://html5-mediasource-api.googlecode.com/svn/trunk/draft-spec/mediasou-rce-draft-spec.html, 1 page, Jul. 11, 2011.
"MediaSource Extensions v0.3," editor A. Colwell, http://html5-mediasource-api.googlecode.com/svn/tags/0.3/draft-spec/media-source-draft-spec.html, 14 pages, Mar. 13, 2012.
"Multimedia over Coax Alliance," Wlikipedia, the free encyclopedia, http://en.wikipedia.org/wiki/Multimedia.sub.--over.sub.--Coax.sub.--Allia-nce, 4 pages, created Jun. 11, 2006.
"Sandbox—The Chromium Projects," http://dev.chromium.org/developers/design-documents/sandbox, 8 pages, Sep. 2, 2008.
"W3C HTML Working Group," http://www.w3.org/html/wg, 9 pages, May 9, 2007.
"Web Cryptography Working Group Charter," W3C Technology and Society domain, http://www.w3.org/2011/11/webcryptography-charter.html, 6 pages, Apr. 3, 2012.
Barth, A. et al., "The Security Architecture of the Chromium Browser," Technical Report, Stanford University, 2008.
Glazkov, D., "What the Heck is Shadow DOM?," http://glazkov.com/2011/01/14/what-the-heck-is-shadow-dom, 14 pages, Jan. 14, 2011.
Metz, C., "Google Native Client: The web of the future—or the past?" The Register, http://www.theregister.co.uk/2011/09/12/google.sub.--native.sub.--.--client.sub.--from.sub.--all.sub.--sides/print.html, 13 pages, Sep. 12, 2011.
Yee, B. et al., "Native Client: A Sandbox for Portable, Untrusted x86 Native Code," IEEE Symposium on Security and Privacy, Oakland 2009, 15 pages, May 16-19, 2009.
Official Communication for U.S. Appl. No. 13/437,789 mailed Mar. 26, 2013, 47 pages.
Official Communication for U.S. Appl. No. 13/437,789 mailed Aug. 14, 2013, 55 pages.
Colwell, A., "Proposal for a MediaSource API that allows sending media data to a HTMLMediaElement," Jul. 11, 2011, pp. 1-11 http://lists.whatwg.org/pipermail/whatwg-whatwg.org/2011-July/032384.html-.
Official Communication for U.S. Appl. No. 13/437,789 mailed Nov. 13, 2013, 3 pages.
Official Communication for U.S. Appl. No. 13/532,734 mailed Oct. 23, 2013, 20 pages.
Official Communication for U.S. Appl. No. 13/654,237 mailed Oct. 23, 2013, 20 pages.
Official Communication for U.S. Appl. No. 13/654,271 mailed Oct. 24, 2013, 20 pages.
Official Communication for U.S. Appl. No. 13/712,764 mailed Nov. 7, 2013, 8 pages.

\* cited by examiner

APPLICATION-DRIVEN PLAYBACK OF OFFLINE ENCRYPTED CONTENT WITH UNAWARE DRM MODULE

CROSS-REFERENCE TO RELATED APPLICATION

This application is a continuation of U.S. application Ser. No. 13/586,664, filed Aug. 15, 2012, which application claims the benefit of U.S. Provisional Application No. 61/569,755, filed Dec. 12, 2011, both of which are incorporated by reference.

TECHNICAL FIELD

The present embodiments relate generally to playing protected content and, more particularly, but not exclusively, to providing an interceptor interface application to intercept communications from/to a Digital Rights Management (DRM) module on a client device to enable the DRM to operate without knowledge of whether the client device is offline or online to at least a key management device to obtain access to decryption keys or a license to enable play of protected content.

BACKGROUND

Today, personal computers are ubiquitous. Merely take a look around a café, street corner, in a bus, airport, or train station, and one will see many people using their smart phones, or other handheld devices. While often these devices are used to communicate messages, they are also used to play video and/or media content.

Although accessing media content over the Internet is quickly gaining popularity, there remain many reasons that this may not be practicable. For example, flying many of today's airlines means that one must either pay additional fees to obtain a network connection, or perhaps not even have such network connectivity available. This may also be true when in underground facilities, such as subways, where a network connection may also be unavailable.

Downloading content and playing the content locally or offline may provide a higher quality of viewing of the content, unimpeded by network delays, low network bandwidth, or the like. However, when the content is protected through various digital rights management policies, some downloaded content might simply not be playable without a network connection available. Thus, it is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present embodiments, reference will be made to the following Detailed Description, which is to be read in association with the accompanying drawings, in which.

DETAILED DESCRIPTION

Figure 1:
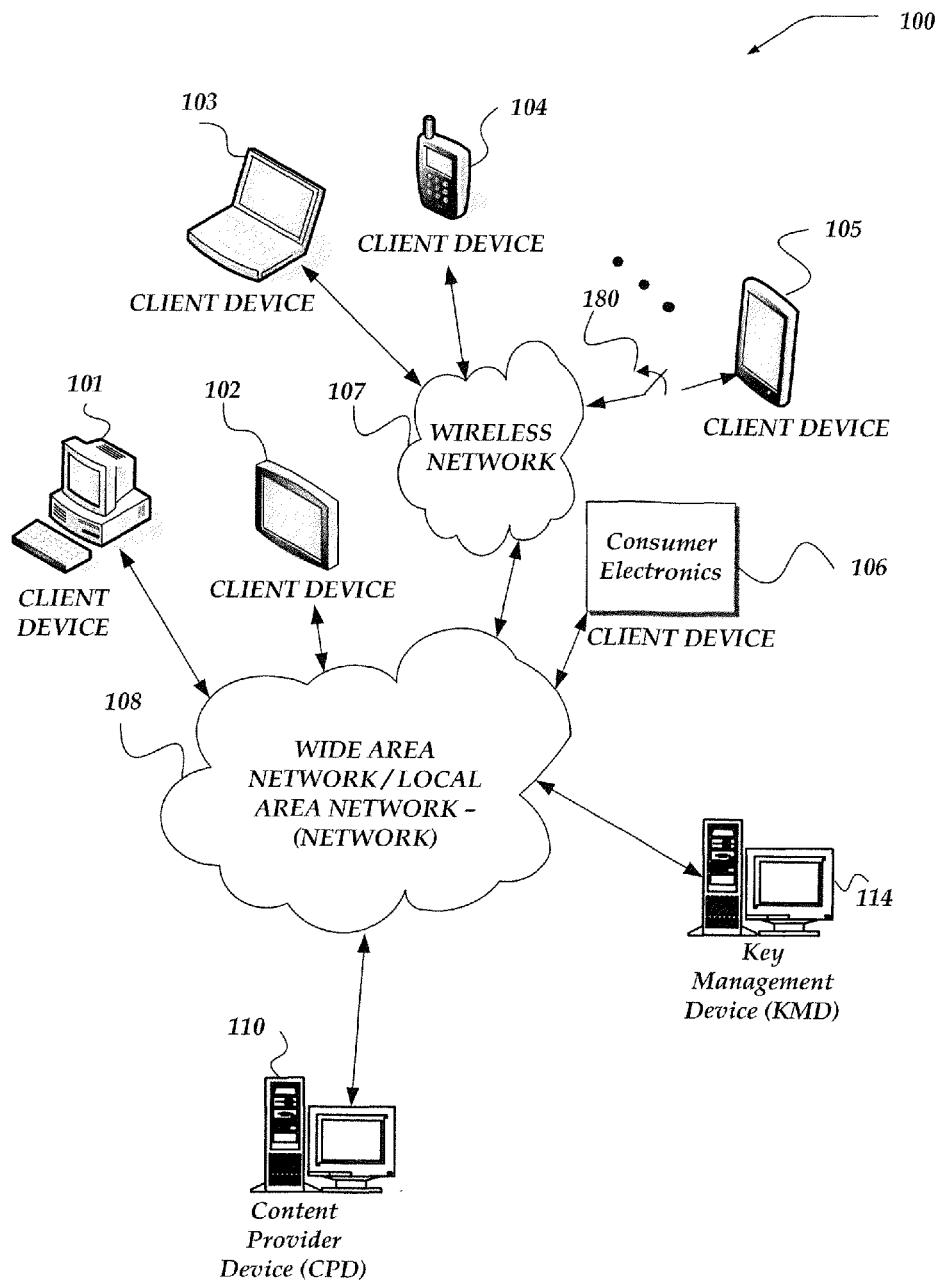
FIG. 1 illustrates a system diagram of one embodiment of an environment in which the embodiments may be practiced.

The present embodiments now will be described more fully hereinafter with reference to the accompanying drawings, which form a part hereof, and which show, by way of illustration, specific aspects in which the embodiments may be practiced. These embodiments may, however, take many different forms and should not be construed as limited to the embodiments set forth herein; rather, these embodiments are provided so that this disclosure will be thorough and complete, and will fully convey the scope to those skilled in the art. Among other things, the present embodiments may include methods or devices. Accordingly, the present embodiments may take the form of entirely hardware or a combination of software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "content" or "media content" includes any digital data that may be communicated over a network to be remotely played by a computing device. Non-exhaustive examples of content include but are not limited to movies, videos, music, spoken word, pictures, illustrations, graphics, images, text, and the like. Content is often described by its format, or container, in which the content is provided. Thus, as used here, the term "container" refers to a data stream or file format which encapsulates audio and visual content. This content often consists of interleaved audio and video data in frames, or slices, with accompanying metadata such as frame timing information, audio and/or video configuration information, encoding information, compression information, and the like. Also, the container is typically arranged to enable content to be presented for playback at a remotely located network device, such as a client device. A container may also be named a "systems stream". A non-limiting and non-exhaustive list of examples of container/system streams formats are: MPEG2-TS (Moving Picture Experts Group ("MPEG") transport stream ("TS")), flash video ("FLV"), MOV (a QuickTime file format), MP4, 3GP, and ASF (Advanced Systems Form), WebM Project file format, Matroska multimedia container format, or the like. A video encoding format, such as H.264, VP8, or the like, may be encapsulated in the container. The content may be distributed as a rights managed systems stream of data over a network such as Pay per View (PPV), Video On Demand (VoD), live streaming, or the like for playback by a remote network device. In one embodiment, the content may be protected through a license that describes how, where, when, by whom, or so forth, content that is protected may be accessed, distributed, copied, or the like. Protected content may be protected using a variety of content protection mechanisms, including through one or more Digital Rights Management (DRM) policies, licenses, and encryption/decryption keys.

As used herein, encryption refers to the process of transforming digital content (referred to as plaintext) using an algorithm (called a cipher) to make it unreadable to anyone except those possessing special knowledge, usually referred to as a key. Decryption is the process of converting encrypted digital content back into its original form. As used herein, "unencrypted" digital content refers to digital content received in plaintext—or that is otherwise not encrypted, and therefore does not need to be decrypted. It should be understood such plaintext digital content, may be received, in at least one embodiment, in a compressed form, or encoded form, and still be considered as plaintext for the purposes described herein. Moreover, as discussed further below, digital content may include portions that are encrypted, and other portions that are unencrypted within a same stream of digital content. Further, different encrypted portions of the stream of digital content may be encrypted using different encryption keys, and/or employ different licenses. In one embodiment, keys useable for decrypting the differently encrypted digital content may be rotated, reused, or renegotiated.

As used herein, the term "automatically," refers to actions performed by a computing device based on one or more decisions performed by the computing device, without an input from a user to directly initiate the action.

As used herein, the term "online" refers to a client device being connected through a network to a remote computing device that is in operation to enable communications between the client device and remote computing device. In contrast, a client device is "offline" when the client device is not connected through a network to the remote computing device such that communications between the client device and remote computing device is unable to occur. In one embodiment, offline and online are consistent with The Federal Standard 1037C of 1996, titled "Telecommunications: Glossary of Telecommunication Terms," issued by the General Services Administration pursuant to the Federal Property and Administrative Services Act of 1949, and which is incorporated in its entirety herein by reference.

It should be understood, however, that the client device may be in communication over a network and therefore, online, to one remote computing device, while being offline to another remote network device. For example, in one embodiment, the client device may be offline to a Key Management Device (KMD), while being online to a content provider device.

The following briefly provides a simplified summary of the subject innovations in order to provide a basic understanding of some aspects. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, subject innovations are directed towards employing an application-driven interceptor (or wrapper) module that enables offline playback of DRM protected content to work in a same way as online playback. That is, a DRM module operating on the client device does not need to be aware of whether the client device is offline or online to a remote license/key service through a network connection. The DRM module may operate virtually the same in either configuration. In this manner, legacy DRM modules need not be rebuilt, modified, or otherwise replaced with DRM modules that are specifically modified to be network connection aware. Moreover, by placing the ability to manage actions based on network connectivity, or lack thereof, in the interceptor application, a content provider may have increased flexibility of how to manage play of the provided content. This is because the content provider may also provide the interceptor application for use by the client device.

Messages and/or other forms of communications with the DRM module are intercepted by the application-driven interceptor that is aware of the client device's network connection status. In one embodiment, when the client device is initially online, such as when downloading the protected content, the interceptor application, may intercept keys and/or licenses from the remote license/key service that might be requested by the DRM module. In one embodiment, the license may include policies for the purpose of offline playback. In one embodiment, the interceptor application may request content and license(s)/key(s) for storing them rather than for immediate playback or use. The interceptor application may store the license/keys in a locally protected data storage device. In one embodiment the local data storage may be encrypted with a private key, or a symmetric key, used by the interceptor application.

In one embodiment, the interceptor application may detect whether the client device is offline or online. When the interceptor application determines that the client device is offline, in one embodiment, messages and/or other communications with the DRM module are intercepted by the interceptor application. Requests for the protected content and related license/key to the protected content may then be managed by the interceptor application. In one embodiment, the interceptor application may retrieve the requested key/license from its locally protected data storage device, and provide the key/license to the DRM module. In this manner, the DRM module may be unaware that its messages are being intercepted, and may then operate the same whether or not the client device is online or offline.

In one embodiment, the interceptor application may intercept messages and other communications from/to the DRM module even when the client device is online or offline. In one embodiment, the interceptor application might select to pass the messages and other communications directly through a network connection when the client device is online, and respond to the messages/communications itself, when the client device is offline. In other embodiments, the interceptor application may modify the messages from the DRM module with additional information, or otherwise modify the message to ensure that the DRM module does not directly receive the messages.

The interceptor application may also include an integrity module that is configured to analyze an integrity of the client device to determine whether or not the protected content and/or license/keys are at a security risk. Should the integrity module detect, for example, an attempt to improperly access the protected content and/or license/keys, or that the integrity of the client device is compromised, the integrity module may instruct the interceptor application to destroy the license/keys and/or protected content, so as to frustrate any further improper attempts. Moreover, based on policy, the integrity module may use different integrity based on being offline than when being online.

It should be noted that other embodiments are also allowable. For example, in one embodiment, the DRM module may store the license/keys for use, or the license/keys may be stored and/or managed through a media player stack, or other application. In one embodiment, the interceptor application may employ a HyperText Markup Language ("HTML") 5 or greater application programming interface (API). In still another embodiment, a browser application may be configured to cache and/or store the license/key offline.

However, it should be recognized that the interceptor application need not be configured merely to perform interceptions of actions, communications, or the like. For example, in other embodiments, interceptor application may initiate actions. Thus, in some embodiments, the interceptor application may provide communications to instruct the DRM and/or media player/stack on what actions to perform. For example, the interceptor application might be configured to request that the DRM perform a key request or to send a license request, or the like. In other embodiments, the interceptor application might request content, keys, and/or licenses to be provided to the client device without the media player/DRM requesting the content, keys, and/or licenses. The interceptor application may then store offline the content, keys, and/or licenses to be sent to the DRM/media player at some later time. Thus, while the interceptor application is herein termed "interceptor," it should be understood that the interceptor application may also operate independently and thereby drive or direct actions to be performed.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 108, wireless network 107, client devices 101-106, Content Provider Device ("CPD") 110, and Key Management Device (KMD) 114.

One embodiment of client devices 101-106 is described in more detail below in conjunction with FIG. 2. In one embodiment, at least some of client devices 101-106 may operate over a wired and/or a wireless network such networks 107 and 108. As shown, client device 101 may include virtually any computing device capable of communicating over a network to send and receive information, including instant messages, performing various online activities, or the like. The set of such devices may include devices that typically connect using a wired or wireless communications medium such as personal computers, multiprocessor systems, microprocessor-based or programmable consumer electronics, network PCs, or the like. Also, client device 102 may include virtually any device usable as a video display device, such as a television, display monitor, display screen, projected screen, and the like. Additionally, client device 106 may include any kind of Consumer Electronic device, e.g., a Blu-ray player, DVD player, CD player, portable music playing device, portable display projector, and the like. Moreover, client devices 101-106 may provide access to various computing applications, including a browser, or other web-based application.

Generally, however, client devices 101-106 may include virtually any portable computing device capable of receiving and sending messages over a network, accessing and/or playing content, such as network 108, wireless network 107, or the like. Further, client devices 103-105 may include virtually any portable computing device capable of connecting to another computing device and receiving information such as, laptop computer 103, smart phone 104, and tablet computers 105, and the like. However, portable computer devices are not so limited and may also include other portable devices such as cellular telephones, display pagers, radio frequency ("RF") devices, infrared ("IR") devices, Personal Digital Assistants ("PDAs"), handheld computers, wearable computers, integrated devices combining one or more of the preceding devices, and the like. As such, client devices 101-106 typically range widely in terms of capabilities and features.

A web-enabled client device may include a browser application that is configured to receive and to send web pages, web-based messages, and the like. The browser application may be configured to receive and display graphics, text, multimedia, media content, and the like, employing virtually any Internet based and/or network-based protocol, including but not limited to a wireless application protocol messages ("WAP"), Hypertext Transfer Protocol ("HTTP"), or the like. In one embodiment, the browser application is enabled to employ Handheld Device Markup Language ("HDML"), Wireless Markup Language ("WML"), WMLScript, JavaScript, Standard Generalized Markup Language ("SGML"), HyperText Markup Language ("HTML"), eXtensible Markup Language ("XML"), and the like, to display and send a message. In one embodiment, a user of a client device may employ the browser application to perform various activities over a network (online). However, another application may also be used to perform various online activities.

Client devices 101-106 also may include at least one other client application that is configured to receive and/or send content between another computing device. The client application may include a capability to send and/or receive content, or the like. The client application may further provide information that identifies itself, including a type, capability, name, and the like. In one embodiment, client devices 101-106 may identify themselves as part of a class of devices. In another embodiment, client devices 101-106 may uniquely identify themselves through any of a variety of mechanisms, including a phone number, Mobile Identification Number ("MIN"), an electronic serial number ("ESN"), Internet Protocol (IP) Address, network address, or other mobile device identifier. The information may also indicate a content format that the mobile device is enabled to employ. Such information may be provided in a network packet, or the like, sent between other client devices, CPD 110, or other computing devices. Moreover, it should be readily understood that devices and/or components within a device that is communicating with a client device may also identify themselves using any of a variety of mechanisms, including those used by the client device.

Client devices 101-106 may further be configured to include a client application that enables an end-user to log into an end-user account that may be managed by another computing device, such as CPD 110, or the like. Such end-user account, in one non-limiting example, may be configured to enable the end-user to manage one or more online activities, including in one non-limiting example, search activities, social networking activities, browse various websites, communicate with other users, or the like. In one embodiment, the end-user's client device may receive content streamed to the client device for play at the client device. However, participation in online activities may also be performed without logging into the end-user account.

Also shown in FIG. 1 is switch 180 that is intended to symbolically represent that a client device, such as client device 105 may be online or offline to a network, such as wireless network 107 and/or network 108. It should be noted, however, that any of client devices 101-106 may be offline or online to a network—although similar switches are not illustrated. While switch 180 is illustrated as 'external' to a client device, this is merely a symbolic artifact, and is not intended to represent an actual physical switch. Instead, it merely illustrates that a client device may be offline or online. However, it should be understood, that a client device may be considered to be online to a network but not be in communications with a particular remote computing device. For example, client device 105 may be online and in communications with Content Provider Device (CPD) 110, but, not be online (i.e., offline) and therefore not in communications with Key Management Device (KMD) 114. However, other variations may also exist. Thus, online/offline includes not only online/offline to a network, but also online/offline with respect to a communications with another computing device.

Wireless network 107 is configured to couple client devices 103-105 and its components with network 108. Wireless network 107 may include any of a variety of wireless sub-networks that may further overlay stand-alone ad-hoc networks, and the like, to provide an infrastructure-oriented connection for client devices 101-106. Such sub-networks may include mesh networks, Wireless LAN ("WLAN") networks, cellular networks, and the like. In one embodiment, the system may include more than one wireless network.

Wireless network 107 may further include an autonomous system of terminals, gateways, routers, and the like connected by wireless radio links, and the like. These connectors may be configured to move freely and randomly and organize themselves arbitrarily, such that the topology of wireless network 107 may change rapidly.

Wireless network 107 may further employ a plurality of access technologies including 2nd (2G), 3rd (3G), 4th (4G) generation radio access for cellular systems, WLAN, Wireless Router ("WR") mesh, and the like. Access technologies such as 2G, 3G, 4G and future access networks may enable wide area coverage for mobile devices, such as client devices 101-106 with various degrees of mobility. In one non-limiting example, wireless network 107 may enable a radio connection through a radio network access such as Global System for Mobil communication ("GSM"), General Packet Radio Services ("GPRS"), Enhanced Data GSM Environment ("EDGE"), Wideband Code Division Multiple Access ("WCDMA"), and the like. In essence, wireless network 107 may include virtually any wireless communication mechanism by which information may travel between client devices 103-106 and another computing device, network, and the like.

Network 108 is configured to couple network devices with other computing devices, including, CPD 110, and through wireless network 107 to client devices 103-105. Network 108 is enabled to employ any form of network mechanism for communicating information from one electronic device to another. Also, network 108 can include the Internet in addition to LANs, WANs, direct connections, such as through a universal serial bus ("USB") port, other forms of network mechanism, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 108 may be configured to transport information of an Internet Protocol ("IP"). In essence, network 108 includes any communication method by which information may travel between computing devices.

Additionally, network mechanisms by way of example, network mechanisms include wired media such as twisted pair, coaxial cable, fiber optics, wave guides, and other wired media and wireless media such as acoustic, RF, infrared, and other wireless media.

One embodiment of CPD 110 is described in more detail below in conjunction with FIG. 3. Briefly, however, CPD 110 includes virtually any network device usable to operate as a content server to connect to network 108 to provide content to client devices 101-106. In some embodiments, CPD 110 may provide protected content to a client device. In one embodiment, at least some portions of the content may be encrypted, while at least some other portions of the content may be unencrypted.

CPD 110 may also provide to a client device, an interceptor application that is configured to be installed and execute within a client device. The interceptor application may be a script, an HTML implemented application, such as implemented in HTML5, or the like. However, the interceptor application may be implemented using virtually any programming mechanism, and is not limited to a particular type. In any event, the interceptor application may include Application Programming Interfaces (APIs), or other components that enable monitoring of communications from/to a DRM module and/or media player stack, application, or the like. The Interceptor application, described in more detail below in conjunction with FIG. 2 may then intercept communications between the DRM module to enable the DRM module and/or media player to operate unaware of whether the client device is online or offline to KMD 114, and/or CPD 110 with respect to access to protected content, decryption keys, and/or related licenses.

It should be readily recognized that CPD 110 is configured to operate on behalf of a content owner, distributor, or similar business entity. However, while used herein to represent such network devices useable to provide content, it is further recognized that other devices may also be employed. For example, a content provider may employ a Content Distribution Network Device (not shown) that operates on behalf of the content provider to provide content. Thus, other configurations and variations of devices serving content are also envisaged, and other embodiments are not constrained to a single configuration/arrangement of devices.

Devices that may operate as CPD 110 include various network devices, including, but not limited to personal computers, desktop computers, multiprocessor systems, microprocessor-based or programmable consumer electronics, network PCs, server devices, network appliances, and the like.

Although FIG. 1 illustrates CPD 110 as a single computing device, the invention is not so limited. For example, one or more functions of CPD 110 may be distributed across one or more distinct network devices. Moreover, CPD 110 is not limited to a particular configuration. Thus, in one embodiment, CPD 110 may contain a plurality of network devices to provide content, licenses, and/or decryption keys to a client device, such as client devices 101-106. Similarly, in another embodiment, CPD 110 may contain a plurality of network devices that operate using a master/slave approach, where one of the plurality of network devices of CPD 110 operates to manage and/or otherwise coordinate operations of the other network devices. In other embodiments, the CPD 110 may operate as a plurality of network devices within a cluster architecture, a peer-to-peer architecture, and/or even within a cloud architecture. Thus, the invention is not to be construed as being limited to a single environment, and other configurations, and architectures are also envisaged.

In one embodiment, CPD 110 may also be configured to manage license requests, and/or access to decryption keys useable to decrypt portions of the encrypted digital content by a client device for play based on the license.

It should be noted that the encrypted content may be encrypted using any of a variety of symmetric and/or asymmetric key technologies. For example, possible asymmetric keys technologies include, but are not limited to, Diffie-Hellman, RSA, Merkle-Hellman, PGP, X.509, elliptic curve techniques, ElGamal, or the like. Similarly, various possible symmetric key technologies include, but are not limited to, Twofish, Serpent, AES (Rijndael), Blowfish, CAST5, RC4, 3DES, and IDEA, to name just a few. Moreover, the content may be protected using a combination of symmetric and asymmetric key technologies. For example, a symmetric content decryption key might be used to encrypt/decrypt the content, and an asymmetric key technology might be used to encrypt/decrypt the content decryption key.

KMD 114 represents one of a variety of network devices for managing access to symmetric and/or asymmetric keys. In one embodiment, KMD 114 may operate to certify an ownership of a public key named within a digital certificate that provides a public key, where the public key is part of a public/private key associated with any of a variety of asymmetric key technologies. This allows others, such as CPD 110, or the like, to rely upon signatures or assertions made by the owner that corresponds to the public key that is certified. In one embodiment, KMD 114 may then operate as a trusted third party. Thus, in one embodiment, KMD 114 may operate as a Certification Authority, such as employed by many public key infrastructures (PKI) schemes. Further, KMD 114 may also provide Certificate Revocation Lists (CRLs) indicating when a public key/certificate is no longer valid, and might no longer be trusted/trustable.

In one embodiment, KMD 114 may receive a public key from a content provider, or the like, and based on various criteria, elect to make accessible the public key through a certificate that KMD 114 digitally signs. In one embodiment, access to the public key may enable an authorized client device to decrypt a content key that may then be used to decrypt at least a portion of the encrypted content.

In one embodiment, KMD 114 or CPD 110 might operate to negotiate a license and/or access to a key with client devices 101-106. In one embodiment, different content decryption keys might be used to encrypt different portions of a provided content. Thus, in one embodiment, multiple key negotiations may be performed for a given at least one content stream.

It should be understood, that while KMD 114 is illustrated as a separate device from CPD 110, in other embodiments, the functions of these devices may be integrated.

Although FIG. 1 illustrates KMD 114 as single computing devices, the invention is not so limited. For example, one or more functions of KMD 114 may be distributed across one or more distinct network devices. Moreover, KMD 114 is not limited to a particular configuration. Thus, in one embodiment, KMD 114 may contain a plurality of network devices. Similarly, in another embodiment, KMD 114 may contain a plurality of network devices that operate using a master/slave approach, where one of the plurality of network devices operates to manage and/or otherwise coordinate operations of the other network devices. In other embodiments, the KMD 114 may operate as a plurality of network devices within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2:
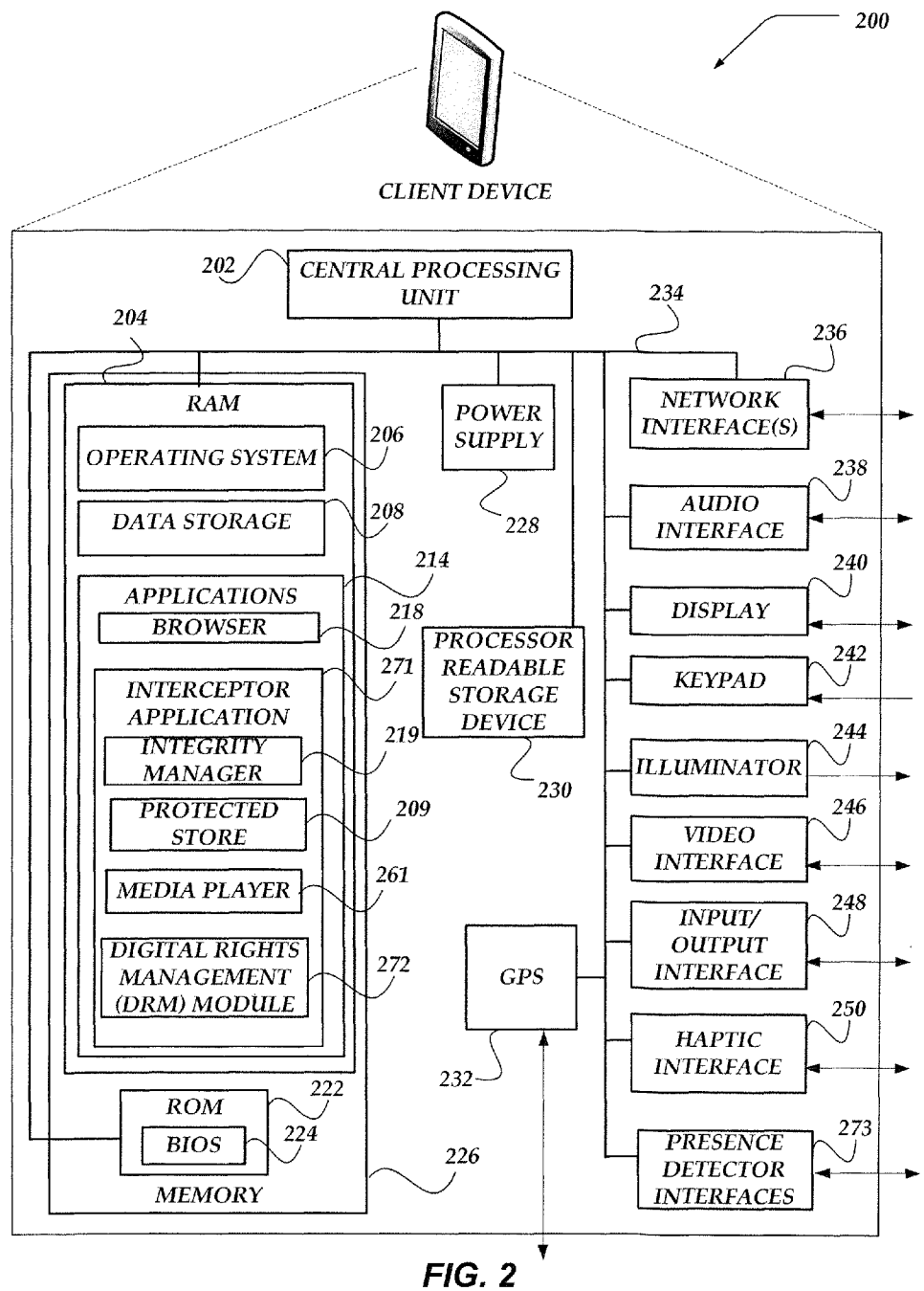
FIG. 2 illustrates one possible embodiment of a client device usable within the environment of FIG. 1.

FIG. 2 shows one embodiment of client device 200 that may be included in a system implementing the innovations. Client device 200 may represent any of a variety of platforms useable to perform actions as disclosed within. Client device 200 may include many more or less components than those shown in FIG. 2. However, the components shown are sufficient to disclose an illustrative embodiment for practicing the present innovations. Client device 200 may represent, for example, one embodiment of at least one of client devices 101-106 of FIG. 1.

As shown in the figure, client device 200 includes a central processing unit ("CPU") 202 in communication with a mass memory 226 via a bus 234. Client device 200 also includes a power supply 228, one or more network interfaces 236, an audio interface 238, a display 240, a keypad 242, an illuminator 244, a video interface 246, an input/output interface 248, a haptic interface 250, a global positioning systems ("GPS") receiver 232, and presence detector interfaces 273.

Power supply 228 provides power to client device 200. A rechargeable or non-rechargeable battery may be used to provide power. The power may also be provided by an external power source, such as an alternating current ("AC") adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, GSM, code division multiple access ("CDMA"), time division multiple access ("TDMA"), user datagram protocol ("UDP"), transmission control protocol/Internet protocol ("TCP/IP"), Short Message Service ("SMS"), GPRS, WAP, ultra wide band ("UWB"), Institute of Electrical and Electronics Engineers ("IEEE") 802.16 Worldwide Interoperability for Microwave Access ("WiMax"), session initiated protocol/real-time transport protocol ("SIP/RTP"), or any of a variety of other wired and/or wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be an LCD, gas plasma, light emitting diode ("LED"), or any other type of display used with a computing device. Display 240 may also include a touch sensitive screen arranged to receive input from an object such as a stylus or a digit from a human hand.

Moreover, display 240 may be configured to employ any of a variety of network connection types, including, but not limited to High-Bandwidth Digital Content Protection (HDCP) connection types, Display Port (DP), Digital Visual Interface (DVI), and High-Definition Multimedia Interface (HDMI), as well as Gigabit Video Interface (GVIF), Standard-definition (SD), Unified Display Interface (UDI), or Intel Wireless Display (WiDi). At least some of these network connection types provide a form of digital copy protection. A detection of whether display 240 is connected through one of these, or other types, of network connection types may be determined using a variety of techniques, including signature transmissions, protocol handshakes, authentication procedures, or the like. Changing usage of a network connection type may indicate a change in the configuration of at least one component of client device 200 that might result in being detected as a compromise to the integrity of client device 200.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client device is powered. Also, illuminator 244 may backlight these buttons in various patterns when particular actions are performed, such as dialing another client device. Illuminator 244 may also cause light sources positioned within a transparent or translucent case of the client device to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor ("CMOS") integrated circuit, charge-coupled device ("CCD"), or any other integrated circuit for sensing light.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like. Haptic interface 250 is arranged to provide tactile feedback to a user of the client device. For example, the haptic interface 250 may be employed to vibrate client device 200 in a particular way when another user of a computing device is calling.

GPS transceiver 232 can determine the physical coordinates of client device 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS ("AGPS"), Enhanced Observed Time Difference ("E-OTD"), Cell Identifier ("CI"), Service Area Identifier ("SAI"), Enhanced Timing Advance ("ETA"), Base Station Subsystem ("BSS"), or the like, to further determine the physical location of client device 200 on the surface of the Earth. It is understood that under different conditions, GPS transceiver 232 can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control ("MAC") address, IP address, or the like.

Mass memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store social networking information including address books, buddy lists, aliases, user profile information, or the like. Further, data storage 208 may also store messages, web page content, or any of a variety of user generated content. At least a portion of the information may also be stored on another component of network device 200, including, but not limited to computer readable storage device 230, a disk drive or other computer-readable storage device (not shown) within client device 200.

In some embodiments, data storage 208 may act as a buffer for content received from CPD 110 of FIG. 1. As noted above, it is recognized that providing of such content may also be performed by another device on behalf of CPD 110 of FIG. 1.

Applications 214 may include computer executable instructions which, when executed by client device 200, transmit, receive, and/or otherwise process messages (e.g., SMS, Multimedia Message Service ("MMS"), instant messages ("IM"), email, and/or other messages), audio, video, and enable telecommunication with another user of another client device. Other examples of application programs include calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth. Applications 214 may include, for example, browser 218, media player 261, Digital Rights Management (DRM) module 272, and interceptor application 271. Interceptor application 271 may also include integrity manager 219 and protected store 209. As discussed further below, interceptor application 271 might not be a native application, but, may be downloaded, and installed based on a communication with a content provider or the like.

Browser 218 may include virtually any application configured to receive and display graphics, text, multimedia, and the like, employing virtually any web based protocol. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client device 200 to provide and/or receive content from another computing device, such as CPD 110 of FIG. 1. Although browser 218 is described herein, it should be noted that there are a plurality of other applications that may operate as user agent configured to request and/or access content. Thus, other user agents may also be included within client device 200.

Media player 261 represents any of a variety of software and/or hardware configurations arranged to receive and play various content. As such, in one embodiment, media player 261 may also represent a hardware component that might be installed within client device 200 and/or coupled electrically to client device 200 to enable client device 200 to access and play content.

In one embodiment, media player 261 may receive content that is protected by one or more encryption keys and/or one or more DRM licenses that determine who, when, where, and/or how the protected content may be accessed, distributed, copied, and/or played. In one embodiment, media player 261 may provide one or more portions of the protected content to DRM 272 to be unencrypted or otherwise prepared for play by media player 261.

DRM 272 represents any of a class of access control technologies that is configured to manage the digital access rights to protected content. In one embodiment, DRM 272 may operate to include a content decryption module (CDM) functionality to receive one or more decryption keys and/or licenses, and to employ the decryption keys to decrypt at least a portion of the content. In one embodiment, DRM 272 might be configured to receive information indicating that content is protected with keys/licenses. DRM 272 may then send a communications requesting the keys/licenses. In one embodiment, DRM 272 might be configured to provide a communications that might be intended for a Key Management Device, such as KMD 114 of FIG. 1 to obtain the keys/licenses. DRM 272 may then receive portions of the protected content from media player 261, browser 218, or another application. DRM 272 may then employ the keys/licenses to decrypt the encrypted content and provide the decrypted content to media player 261, or the like, for play. In one embodiment, DRM 272 may operate as a secure pipeline to provide the content directly to a display/audio output device, or otherwise securely to media player 261.

Interceptor application 271 is configured to intercept communications between DRM 272, media player 261, or the like for protected content and keys/licenses. Interceptor application 271 may then store the protected content, keys/licenses in a protected store, such as protected store 209. In one embodiment, protected store 209 may be configured such that content, keys, licenses, or the like are encrypted using a private key, symmetric key or the like, known to interceptor application 271. Interceptor application 271 may then monitor communications and a network status of client device 200, to provide the stored protected content, keys/licenses or the like to DRM 272, media player 261, or the like, from protected store 209 when client device 200 is offline to a key management service, a content provider, or other related remote computing device. It should be noted, that the protected content and keys/licenses may also be stored in data storage 208, in one embodiment.

Interceptor application 271 may also include integrity manager 219 that is configured to monitor an integrity of client device 200 for possible security issues that might be construed as enabling improper access to the protected content, keys, or licenses. Integrity manager 219 may monitor a variety of components and actions within client device 200 to determine the integrity, including, but not limited to memory content, types of programs being executed by operating system 206, types of drivers, hardware configuration, or the like. When integrity manager 219 determines that the integrity of client device 200 is compromised, integrity manager 219 may perform a variety of actions, including, but not limited to destroying the protected content, the keys, and/or licenses. Integrity manager 219 may also send one or more messages to another computing device indicating that the integrity of client device 200 is compromised.

While integrity manager 219 and protected store 209 are herein illustrated as components within interceptor application 271, other configurations are also envisaged. Thus, for example, integrity manager 219 and/or protected store 209 may be distinct and separate components from interceptor application 271. Further, protected store 209 may also reside in another device of client device 200, including, for example, processor readable storage device 230, or the like. Moreover, interceptor application 271 and/or integrity manager 219 may perform actions such as described in more detail below in conjunction with FIG. 4.

Further, interceptor application 271, integrity manager 219 and protected store 209 may be configured to be downloaded from a remote computing device, for installation within client device 200.

Illustrative Network Device

Figure 3:
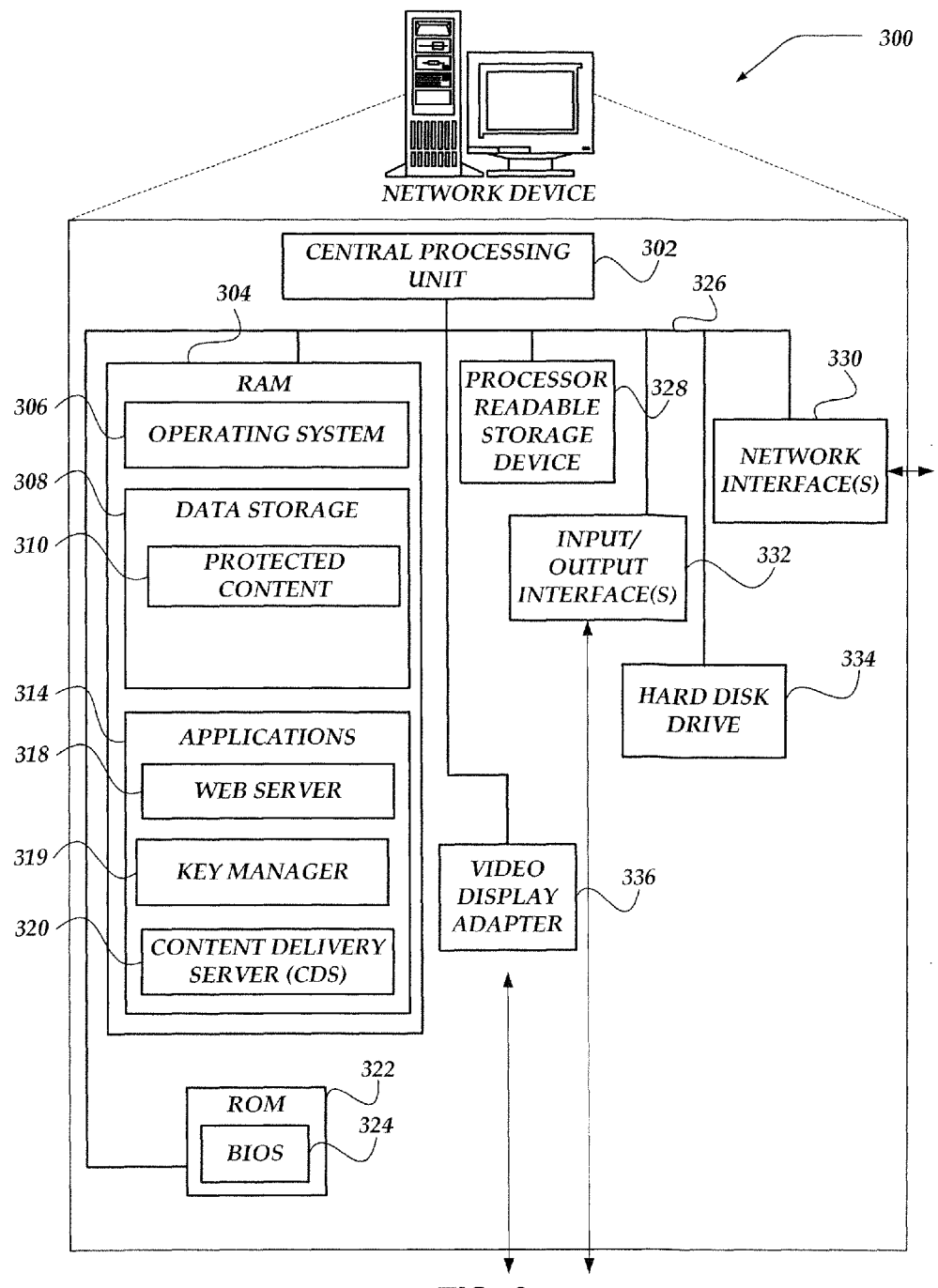
FIG. 3 illustrates one possible embodiment of a network device usable by a content provider within the environment of FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, a client, a peer, a host, or any other device. Network device 300 may represent, for example CPD 110 of FIG. 1.

Network device 300 includes central processing unit 302, computer readable storage device 328, network interface unit 330, an input/output interface 332, hard disk drive 334, video display adapter 336, and a mass memory, all in communication with each other via bus 326. The mass memory generally includes RAM 304, ROM 322 and one or more permanent (non-transitory) mass storage devices, such as hard disk drive 334, tape drive, optical drive, and/or floppy disk drive. The mass memory stores operating system 306 for controlling the operation of network device 300. Any general-purpose operating system may be employed. BIOS 324 is also provided for controlling the low-level operation of network device 300. As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

The mass memory as described above illustrates another type of computer-readable media, namely computer-readable storage media and/or processor-readable storage media.

Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, Electrically Erasable Programmable Read-only Memory ("EEPROM"), flash memory or other memory technology, Compact Disc Read-only Memory ("CD-ROM"), digital versatile disks ("DVD") or other optical storage, magnetic cassettes, magnetic tape, magnetic disk storage or other magnetic storage devices, or any other physical media which can be used to store the desired information and which can be accessed by a computing device.

As shown, data storage 308 may include a database, text, spreadsheet, folder, file, or the like, that may be configured to maintain and store user account identifiers, user profiles, email addresses, IM addresses, and/or other network addresses, or the like. Data storage 308 may further include program code, data, algorithms, and the like, for use by a processor, such as central processing unit 302 to execute and perform actions. In one embodiment, at least some of data storage 308 might also be stored on another component of network device 300, including, but not limited to computer readable storage device 328, hard disk drive 334, or the like.

Data storage 308 may further store streams of protected content 310. Streams of protected content 310 represent any of a variety of content that may be protected from access using a license, encryption, and/or the like. In some embodiments, protected content 310 may include a plurality of available versions of content. In one embodiment, the available versions may include one or more video tracks and/or one or more one or more audio tracks.

The mass memory also stores program code and data. One or more applications 314 are loaded into mass memory and run on operating system 306. Examples of application programs may include transcoders, schedulers, calendars, database programs, word processing programs, Hypertext Transfer Protocol ("HTTP") programs, customizable user interface programs, IPSec applications, encryption programs, security programs, SMS message servers, IM message servers, email servers, account managers, and so forth. Web server 318, key manager 319, and content delivery server 320, may also be included as application programs within applications 314.

Web server 318 represent any of a variety of services that are configured to provide content, including messages, over a network to another computing device. Thus, web server 318 includes, for example, a web server, an FTP server, a database server, a content server, or the like. Web server 318 may provide the content including messages over the network using any of a variety of formats including, but not limited to WAP, HDML, WML, SGML, HTML, XML, Compact HTML ("cHTML"), Extensible HTML ("xHTML"), or the like. Web Server 318 may also be configured to enable a user of a client device, such as client devices 101-106 of FIG. 1, to browse content, such as streams of protected content 310, and select content for display/play on the client device. Further, web server 318 may be configured to provide for installation at a client device, an interceptor application and/or integrity manager.

Key manager 319 is configured to manage negotiations of decryption keys and/or licenses for content streams. In one embodiment, key manager 319 may provide decryption keys and/or licenses to KMD 114 of FIG. 1. In other embodiments, key manager 319 may perform negotiations directly with a client device. In one embodiment, key manager 319 may select one or more content decryption keys for use in encrypting different portions of a content stream.

Key manager 319 may also be configured to revoke a license, and/or invalidate one or more decryption keys, based, for example, on an unauthorized request for a license, key, or even based on receiving an indication that an integrity of a requesting client device is determined to be compromised.

Content Delivery Server (CDS) 320 is configured to manage access to protected content 310. In one embodiment, the content may be protected through a license or licenses. In another embodiment, the content may be protected by being encrypted. In one embodiment, one portion of content may be encrypted using a first content encryption key; while another portion of the content may be encrypted using a second content encryption key. Thus, to decrypt the protected content, a user's client device may need access to a license that indicates how, where, and/or when the protected content may be accessed. The user's client device may also need access to one or more decryption keys usable to decrypt various portions of the protected content. In one embodiment, where multiple encryption keys are used to encrypt the content, a key rotation scheme may be employed, where the client device is provided an indication that the content is encrypted using a different key, and that the client device will have to use the different key. However, in another embodiment, the content may be protected by a license(s) and not be encrypted using encryption key(s).

General Operation

Figure 4:
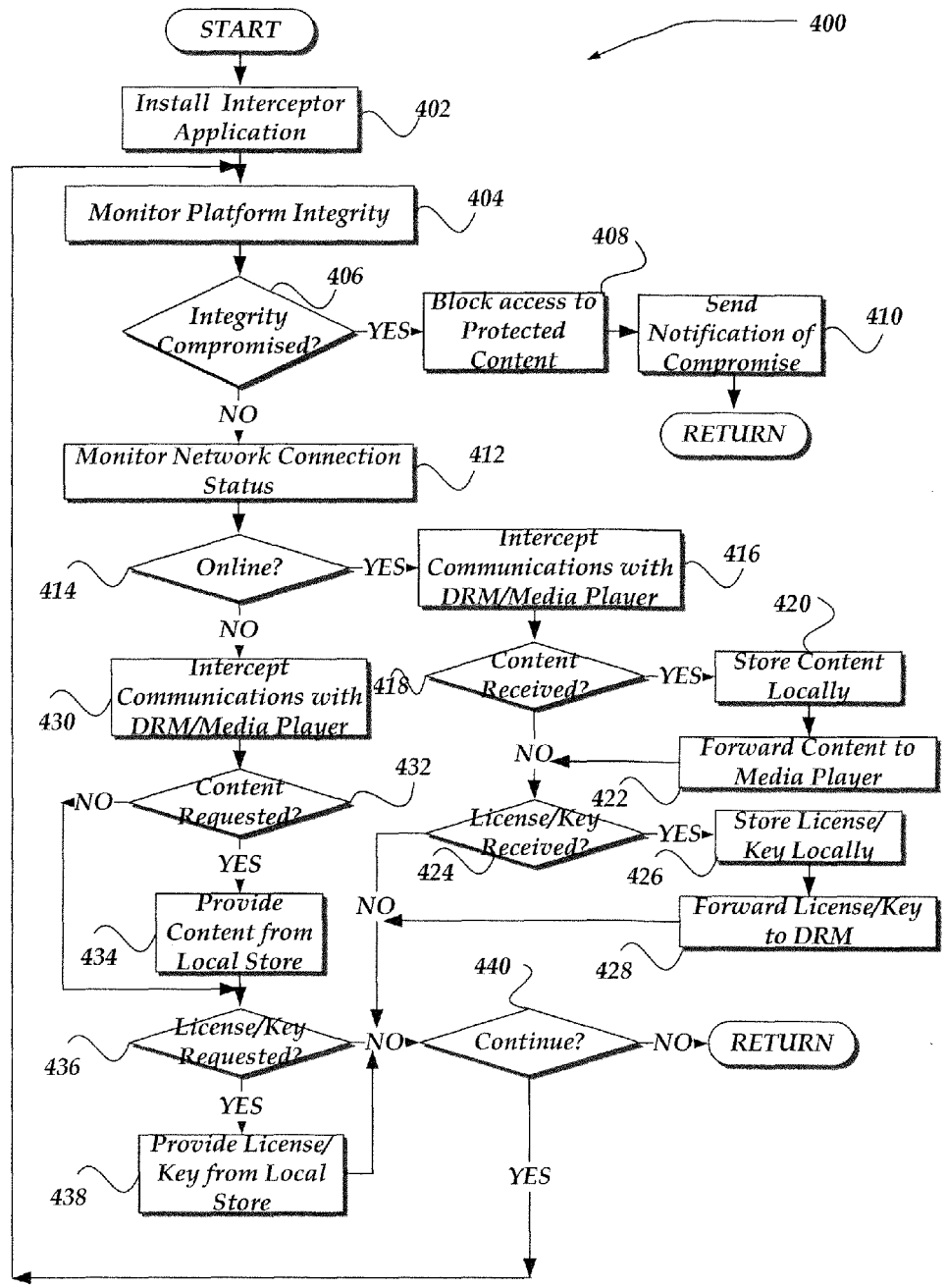
FIG. 4 illustrates a flow chart of one embodiment of a process usable to enable content protected by a Digital Rights Management (DRM) module to be playable whether the client device is online or offline.

The operation of certain aspects of various embodiments will now be described with respect to FIG. 4. FIG. 4 illustrates a flow chart of one embodiment of a process usable to enable content protected by a Digital Rights Management (DRM) module to be playable whether the client device is online or offline. Portions of process 400 of FIG. 4 may be performed by interceptor application 271 and/or integrity manager 219 of FIG. 2, where download and installation of these modules may be performed at least in part by browser 218 of FIG. 2.

Process 400 begins, after a start block, where the interceptor application, including integrity manager, is installed on a client device. In one embodiment, a user of the client device may perform actions with a content provider device, or the like, that might include registering to receive protected content, selecting protected content for access, or performing any of a variety of other actions that may initiate a download and installation of the interceptor application onto the client device.

Processing then flows to block 404, where the installed integrity manager optionally monitors various components of the client device to determine an integrity of the client device. In one embodiment, a plurality of rules, policies, or the like, may be analyzed to determine the integrity. In one embodiment, while block 404 is illustrated as a separate block performed sequentially, other configurations are also possible. For example, the integrity of the client device optionally may be continually monitored, concurrently with execution of other blocks of FIG. 4.

In any event, flowing to decision block 406, a determination is made whether the integrity of the client device is compromised such that it is determined that protected content, keys, and/or licenses might be improperly accessed or accessible. When such a compromise is detected, processing flows to block 408; otherwise processing flows to block 412.

At block 408, access to the protected content may be blocked using any of a variety of mechanisms, including, destroying or otherwise rendering inoperative a key, license, or protected content. Processing moves next to block 410, where optionally, a message may be sent to another computing device providing notification of the compromise. Process 400 may then return to a calling process.

At block 412, the interceptor application may continually monitor a network connection status to determine whether the client device is online or offline for communications with a key management device and/or content provider device.

Flowing to decision block 414, a determination is made whether the client device is online to the content provider device and/or key management device. When it is determined that the client device is online to one or more of these devices, processing flows to block 416; otherwise, processing flows to block 430.

At block 416, communications between the DRM and/or media player and a remote computing device are monitored by interceptor application. Such communications might include a request to download or otherwise access and/or play protected content. The communications might also include a request for access to a decryption key or keys and/or a DRM license. Also monitored are responses to the requests, including any protected content, keys, and/or licenses that might be provided in response. Should the communication include sending of passwords, credentials, or other information to enable access of the requested items, these too may also be monitored for. Thus, proceeding to decision block 418, a determination is made whether protected content is being received. If so, processing flows to block 420; otherwise, processing flows to decision block 424.

At block 420, the received protected content may be stored locally on the client device. Flowing next to block 422, the protected content may also be provided to a media player, browser or other requesting module on the client device. Processing then flows to decision block 424.

At decision block 424, a determination is made whether a key/license for the protected content is received. When, it is, processing flows to block 426; otherwise processing flows to decision block 440. At block 426, the received license(s)/key(s) is/are stored securely in a local store on the client device. The key/license may then also be provided to the DRM module. Processing then flows to decision block 424.

At block 430, it was determined back at decision block 414 that the client device is not online to the content provider device and/or key management device. Thus, at block 430, the client device is offline for one or more of these devices. This is relevant because, in one embodiment, the client device may be online to access remotely the protected content, but offline for access to the key/license to the protected content. Thus, below, illustrates one embodiment, where the protected content and key/license are obtained during offline situations from local storage. However, it should be understood, that the content might be obtained online, while the key/license are obtained offline. Processing, in any event, flows next to decision block 432.

In one embodiment, at decision block 432, a determination is made whether the protected content is being requested. If so, processing flows to block 434; otherwise, processing flows to decision block 436. At block 434, the protected content is accessed and provided to the requesting browser, media player, or the like. As noted above, in one embodiment, the content may be obtained online to the content provider, while in another embodiment, the content might be obtained locally during an offline condition—offline that is, to the content provider device. Processing then moves to decision block 436, where a determination is made whether a license/key to the protected content is requested while the client device is in an offline condition to the key management device.

In the offline condition to the key management device, the requested license/key may be obtained by the interceptor application from a local store and provided to the DRM module in response to the request for the license/key. Processing continues to decision block 440, where a determination is made to continue monitoring for offline/online status of the client device. If so, the processing flows back to block 404; otherwise processing returns to a calling process.

It should be understood that storage and access of protected content and keys/licenses during an offline condition of the client device provides numerous advantages. For example, by wrapping and intercepting communications with the DRM module and/or media player, the DRM module and media player need not be modified to behave differently when the client device is offline versus online. Thus, legacy DRM modules, and media players may continue to operate. Moreover, use of the interceptor application provides more control and flexibility to the content providers. Further, locally stored content, keys and licenses may be retrieved and used more quickly than requesting and obtaining these items over a network. Therefore, it might be feasible to expect a faster time to a first frame or seek point in the content for playing the content. However, other benefits also arise, and thus the innovations are not limited to these benefits.

Thus, as can be seen, the above is directed to dynamically changing the stream quality to match a current level of presence of the user and a configuration of the client device. This is performed to maintain a best level of user experience consistent with the level of presence and configuration. Moreover, as noted, such changes are directed to occur, at least downwards when the user is unlikely to notice the difference and in a manner that is directed to optimizing consumption of resources.

As noted above, the interceptor application need not operate merely to intercept communications between a browser, media player, and/or DRM. In other embodiments, the interceptor application may actually be configured to drive communications, and/or other actions. For example, in some embodiments, the interceptor application may request content to be downloaded onto the client device, absent a request for the content from the browser, media player, or the like. Further, the interceptor application may also request keys and/or licenses to be downloaded, absent a request from the DRM, media player, or the like. In this manner, the interceptor application may store the content, keys/licenses offline for a subsequent use.

Further, the interceptor application may initiate communications with the media player, browser, and/or DRM instructing these components to perform other actions. For example, in one embodiment, the interceptor application may request that the media player request a key/license request from by the DRM.

Figure 5:
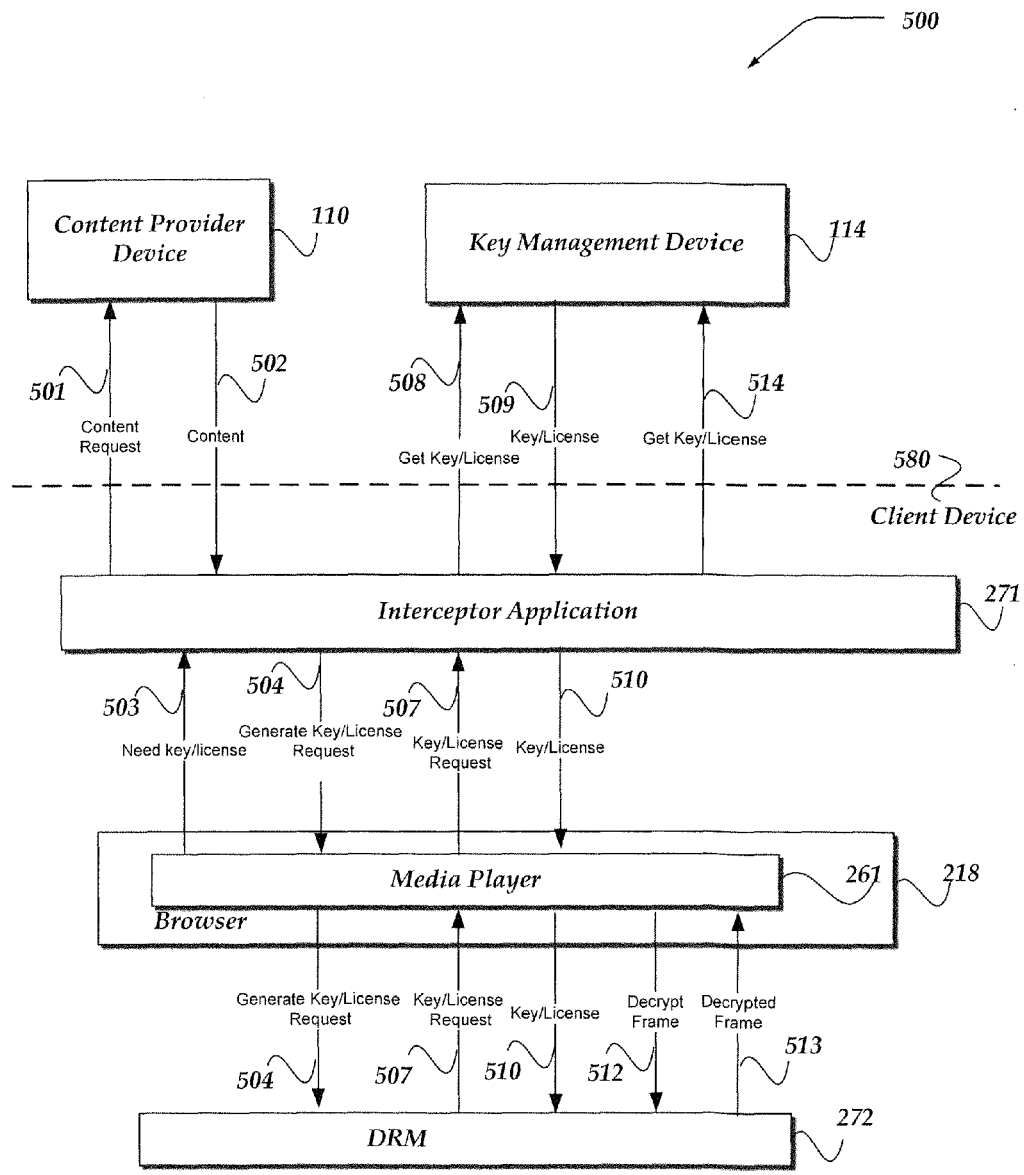
FIG. 5 illustrates non-limiting, non-exhaustive examples of communication flows between components using an application to drive the communications.

To illustrate some of these and other actions, FIG. 5 is directed towards showing one non-limiting, non-exhaustive example of communications flow between components using an application to drive the communications. Flows 500 may include many more or less components than those shown in FIG. 5. However, the components and flows shown are sufficient to disclose an illustrative embodiment for practicing the innovations.

Shown in FIG. 5 are Content Provider Device (CPD) 110, Key Management Device (KMD) 114, and client device 580. CPD 110 and KMD 114 are described above in conjunction with FIG. 1. Client device 580 represents one embodiment of client device 200 of FIG. 2, having interceptor application 271, browser 218, media player 261, and DRM 272, which are each described above in conjunction with FIG. 2.

As discussed above, interceptor application 271 may operate to intercept communications between browser 218, media player 261, and/or DRM 272, as well as CPD 110 and/or KMD 114. However, interceptor application 271 may also initiate actions to be performed.

As shown in FIG. 5, a content request 501 may be sent from interceptor application 271 to CPD 110. In one embodiment, content request 501 may be intercepted from, for example, browser 218, media player 261, or the like. However, in other embodiment, content request 501 may be initiated by interceptor application 271, absent interception of a request from another component within client device 580. In response, CPD 110 may provide the content 502, which may again be intercepted by interceptor application 271. In one embodiment, interceptor application 271 may provide the content to browser 218 and/or media player 261. However, in another embodiment, interceptor application 271 may elect to store content 502 offline for a subsequent use.

In one embodiment, media player 261 may receive the content 502, and send a request indicating that a key/license is needed 503. However, in another embodiment, absent this request 503 (or based on request 503), interceptor application 271 might send a request to generate key/license request 504 to media player 261, and/or DRM 272. In response, DRM 272 may then send key/license request 507, which may then be intercepted by interceptor application 271. In one embodiment, interceptor application 271 may pass key/license request 507 directly to KMD 114, or modify the request as get key/license 508. In response, KMD 114 may provide the key/license 509, which may be intercepted by interceptor application 271. In one embodiment, interceptor application 271 may select to store the key/license, and/or forward the key/license as flow communication 510 to media player 261 and/or DRM 272. DRM 272 may then employ the key/license 510 when a request to decrypt a frame 512 is received. DRM 272 may then provide the decrypted frame 513 to the media player 261, or otherwise securely to an output device. Also shown, get key/license 514 may represent communications with interceptor application 271 that are initiated by interceptor application 271, rather than based on actions and/or requests from media player 261, browser 218, and/or DRM 272.

Thus, as disclosed above, interceptor application 271 may operate to drive various actions, and/or operate to intercept various actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system, a cloud system, a multi-server system, or the like. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A method comprising:

determining, by an interceptor application, whether a client device is offline or online with respect to network communications with a remote key management device (KMD) that manages content decryption data, wherein the client device is offline with the KMD if communications between the client device and the KMD are unable to occur and the client device is online with the KMD if communications between the client device and the KMD are able to occur;

when it is determined that the client device is online with the KMD:

obtaining content decryption data for protected content from the KMD;

providing the content decryption data obtained from the KMD to a digital rights management (DRM) module on the client device, such that the DRM module uses the content decryption data to decrypt at least a portion of the protected content for play by the client device;

securely storing in a local store of the client device the content decryption data; and when it is determined that the client device is offline to the KMD:

intercepting, by the interceptor application, a request for the content decryption data from the DRM module to the KMD; and providing the stored content decryption data to the DRM module from the local store, such that the DRM module uses the content decryption data to decrypt at least a portion of the protected content for play by the client device.

2. The method of claim 1, wherein providing the stored decryption data further comprises:

determining an integrity of the client device;

when it is determined that the integrity of the client device is compromised, inhibiting access to the decryption data, such that the DRM module is inhibited from decrypting the portion of protected content; and when it is determined that the integrity of the client device is uncompromised, providing access to the decryption data to the DRM module responsive to the intercepted request.

3. The method of claim 1, wherein the interceptor application is arranged to intercept messages and other communications from the DRM module when the client device is offline or online, the DRM module being unaware of whether the messages and other communications are intercepted.

4. The method of claim 1, wherein the interceptor application initiates obtaining the decryption data for protected content from the KMD absent a request for the decryption data being received from the DRM module, a browser, or a media player.

5. The method of claim 1, wherein the client device is configured to access the protected content online from a content provider device while the client device is offline to the KMD.

6. The client device of claim 1, further comprising:
when the client device is online to a content provider, obtaining the protected content over a network; and
when the client device is offline to the content provider, obtaining the protected content from the local store on the client device.

7. A system, comprising:
one or more memory storage devices that store executable components, protected content, and decryption data enabling use of the protected content; and
one or more processors that execute the stored executable components, the executable components executable to perform steps comprising:
monitoring, by an interceptor application, whether a client device is offline or online with respect to network communications with a remote key management device (KMD) that manages content decryption data, wherein the client device is offline with the KMD if communications between the client device and the KMD are unable to occur and the client device is online with the KMD if communications between the client device and the KMD are able to occur;
when it is determined that the client device is online with the KMD:
intercepting content decryption data for protected content from the KMD;
providing the content decryption data intercepted from the KMD to a digital rights management (DRM) module on the client device, such that the DRM module uses the content decryption data to decrypt at least a portion of the protected content for play by the client device;
securely storing in a local store of the client device the intercepted content decryption data; and
when it is determined that the client device is offline to the KMD:
intercepting, by the interceptor application, a request for the content decryption data from the DRM module to the KMD; and
providing the stored content decryption data to the DRM module from the local store, such that the DRM module uses the content decryption data to decrypt at least a portion of the protected content for play by the client device.

8. The system of claim 7, wherein providing the securely stored content decryption data further comprises:
determining an integrity of the client device;
when it is determined that the integrity of the client device is compromised, inhibiting access to the decryption data, such that the DRM module is blocked from decrypting the portion of protected content; and
when it is determined that the integrity of the client device is uncompromised, providing access to the decryption data to the DRM module responsive to the intercepted request.

9. The system of claim 7, wherein interceptor application employs a private key to securely store the decryption data locally on the system.

10. The system of claim 7, wherein the interceptor application is further arranged to perform actions, including:
when the system is online to a content provider, obtaining the protected content over a network; and
when the system is offline to the content provider, obtaining the protected content from a local store on the system.

11. The system of claim 7, wherein the interceptor application is downloaded from a remote computing device and installed for execution on the system.

12. The system of claim 7, wherein access to the protected content and decryption data enables a reduced time to a first frame for playing of the protected content.

13. The system of claim 7, wherein the system is configured to access the protected content online from a content provider device while the system is offline to the KMD.

14. A non-transitory computer-readable storage medium storing computer executable code, the computer-executable code when executed by a processor causing the processor to perform a process comprising:
monitoring, by an interceptor application, whether a client device is offline or online with respect to network communications with a remote key management device (KMD) that manages content decryption data, wherein the client device is offline with the KMD if communications between the client device and the KMD are unable to occur and the client device is online with the KMD if communications between the client device and the KMD are able to occur;
when it is determined that the client device is online with the KMD:
intercepting content decryption data for protected content from the KMD;
providing the content decryption data intercepted from the KMD to a digital rights management (DRM) module on the client device, such that the DRM module uses the content decryption data to decrypt at least a portion of the protected content for play by the client device;
securely storing in a local store of the client device the intercepted content decryption data; and
when it is determined that the client device is offline to the KMD:
intercepting, by the interceptor application, a request for the content decryption data from the DRM module to the KMD; and
providing the stored content decryption data to the DRM module from the local store, such that the DRM module uses the content decryption data to decrypt at least a portion of the protected content for play by the client device.

15. The computer-readable storage medium of claim 14, wherein the interceptor application is further arranged to perform actions, including:
when the client device is online to a content provider, obtaining the protected content over a network; and
when the client device is offline to the content provider, obtaining the protected content from the local store on the client device.

16. The computer-readable storage medium of claim 14, wherein interceptor application employs a private key to securely store the decryption data locally on the client device.

17. The computer-readable storage medium of claim 14, wherein selectively providing the stored decryption data further comprises:
determining an integrity of the client device;

when it is determined that the integrity of the client device is compromised, inhibiting access to the decryption data, such that the DRM module is inhibited from decrypting the portion of protected content; and when it is determined that the integrity of the client device is uncompromised, providing access to the decryption data to the DRM module responsive to the intercepted request.

18. The computer-readable storage medium of claim 14, wherein the client device is configured to access the protected content online from a content provider device while the client device is offline to the KMD.

19. The computer-readable storage medium of claim 14, wherein access to the protected content and decryption data enables a reduced time to a first frame for playing of the protected content.

20. The computer-readable storage medium of claim 14, wherein the interceptor application initiates obtaining the decryption data for protected content from the KMD absent a request for the decryption data being received from the DRM module, a browser, or a media player.

* * * * *